United States Patent
Kashiwagi et al.

(10) Patent No.: US 7,175,220 B2
(45) Date of Patent: Feb. 13, 2007

(54) DEVICE FOR ATTACHING AND REMOVING COMPONENT TO AND FROM VEHICLE

(75) Inventors: Akira Kashiwagi, Shizuoka (JP); Shigeto Yamasaki, Shizuoka (JP)

(73) Assignee: Yamaha Hatsudoki Kabushiki Kaisha, Shizuoka-Ken (JP)

( * ) Notice: Subject to any disclaimer, the term of this patent is extended or adjusted under 35 U.S.C. 154(b) by 247 days.

(21) Appl. No.: 11/001,565

(22) Filed: Dec. 1, 2004

(65) Prior Publication Data

US 2005/0161270 A1 Jul. 28, 2005

(30) Foreign Application Priority Data

Dec. 3, 2003 (JP) ............................. 2003-405264

(51) Int. Cl.
*B60N 2/02* (2006.01)

(52) U.S. Cl. ............... 296/65.03; 296/1.07; 280/288.4

(58) Field of Classification Search ............... 296/63, 296/65.03, 7.07, 78.1; 248/201; 211/17, 211/18; 403/325, 326, 111, 327; 24/656; 280/288.4, 304.5; 297/440.22
See application file for complete search history.

(56) References Cited

U.S. PATENT DOCUMENTS

| | | | | |
|---|---|---|---|---|
| 4,993,731 A | * | 2/1991 | Fuller | 280/202 |
| 5,667,232 A | * | 9/1997 | Gogan et al. | 280/202 |
| 5,853,217 A | * | 12/1998 | Armstrong | 296/78.1 |
| 6,347,804 B1 | * | 2/2002 | Seibel | 280/288.4 |
| 6,443,344 B1 | * | 9/2002 | Nicosia et al. | 224/413 |
| 6,484,914 B1 | * | 11/2002 | Willey | 224/413 |
| 6,648,408 B1 | * | 11/2003 | Grove | 297/195.13 |
| 6,729,515 B2 | * | 5/2004 | Nicosia et al. | 224/413 |
| 6,840,704 B1 | * | 1/2005 | Monson | 403/325 |
| 6,892,992 B2 | * | 5/2005 | Donahue | 248/201 |
| 2006/0163900 A1 | * | 7/2006 | van der Hoeven | 296/78.1 |

\* cited by examiner

*Primary Examiner*—Jason Morrow
(74) *Attorney, Agent, or Firm*—Hogan & Hartson LLP

(57) ABSTRACT

A device for attaching and removing a vehicle component to and from a vehicle includes a vehicle body side formed with a contacted portion with which a component can come into contact and a locking device for making a locking action for removably attaching the vehicle component to the vehicle body side in a state of the vehicle component being held in contact with the contacted portion. The vehicle component is made capable of coming from outside into contact with the contacted portion and movable in one direction generally in a straight line while the vehicle component remains held in contact with the contacted portion, and the locking device is adapted to make the locking action as interlocked with a motion of the vehicle component in the one direction.

20 Claims, 7 Drawing Sheets

DEVICE FOR ATTACHING AND REMOVING COMPONENT TO AND FROM VEHICLE

BACKGROUND OF THE INVENTION

1. Field of the Invention

This invention relates to a device for easily attaching and removing a component such as a seatback of a vehicle such as a motorcycle to and from a vehicle body side.

2. Description of Related Art

There exists a conventional device for attaching and removing a vehicle component to and from the vehicle. Accordingly, the vehicle component, a seatback, is provided to be capable of being attached and removed to and from the vehicle body side.

While it is a practice to use a seatback secured on the vehicle body side in such a case as riding the motorcycle over a long distance for an extended period of time, leaving the seatback secured to the vehicle body side might detract from the overall appearance of the motorcycle because the seatback is of a practical nature.

Therefore, it is a common practice to improve the overall appearance of the motorcycle by removing the seatback in advance from the vehicle body side when it is anticipated that evaluations of third parties may arise on the appearance of the motorcycle as when riding the motorcycle to visit events and shows related to motorcycles. For that reason, a seatback for motorcycles is proposed that can be attached and removed to and from the vehicle body side.

To explain the constitution of the motorcycle more in detail, the vehicle body side is provided with a contacted portion with which the seatback can come into contact, and with a locking device for making a "locking action" to removably attach the seatback to the vehicle body side in the state of the seatback in contact with the contacted portion.

The contacted portion is made as an engage-stop pin erected on the vehicle body side. An engage-stop notch formed in the front end of the front lower part of the seatback removably fits over and is in contact with the engage-stop pin. The seatback may be turned up and down about the engage-stop pin in the state of the engage-stop notch fitting over the engage-stop pin.

The locking device is provided with a locking pin erected on the vehicle body side. On the other hand, a locking notch is formed on the lower end of the lower rear part of the seatback. When the seatback is turned downward about the engage-stop pin, the locking notch fits removably over the locking pin.

The locking device is also provided with a hook pivoted at the rear lower part of the seatback and with a closing member attached to the hook for resiliently closing the opening of a hooking hole of the hook. By turning the hook toward the locking notch, the hooking hole of the hook and the locking pin fitting into the locking notch are made capable of fitting and moving to and from each other. When the locking pin and the hook are fitted together, the closing member resiliently closes the opening of the hooking hole to maintain the fitting. That is to say, the seatback is secured to the vehicle body side in the state of contacting the contacted portion, the engage-stop pin.

To do the work for securing the seatback to the vehicle body side, first the entire seatback is moved forward downward from a position rear above the engage-stop pin to fit the engage-stop notch over the engage-stop pin. While holding the fitted state, the seatback is turned downward about the engage-stop pin. Then, the locking notch fits over the locking pin and, at the same time, the closing member once recedes as pressed with the locking pin. The opening of the hooking hole is opened and the hook fits with the locking pin. When this fitting is completed, the closing member resiliently closes the opening of the hooking hole, and the seatback is secured. Thus, the securing work is finished.

On the other hand, to remove the seatback from the vehicle body side, the closing member is operated to open the hooking hole and to release the fit between the locking pin and the hook. After that, the work may be done in the reverse sequence of the securing work.

Here, the conventional device described above has the following problems.

First, when doing the work for securing the seatback to the vehicle body side, as described above, first the entire seatback must be moved forward downward from a position rear above the engage-stop pin to fit the engage-stop notch over the engage-stop pin and, while holding the fitted state, the seatback must be turned downward about the engage-stop pin. However, such a securing work is complicated. Moreover, this securing work requires turning the seatback in addition to moving it. Because this securing work requires a large working space, the securing work as described above is undesirable for vehicles generally having a small surplus space.

Second, the seatback in use tends to be turned downward about the engage-stop pin with a great external force exerted by the rider. At this time, a great load is applied from the seatback toward the vehicle body through the hook fitting with the locking pin. Because the hook is pivoted on the seatback and does not have great strength, it is not easy to sustain the load exerted from the seatback toward the vehicle body with the vehicle body side.

Third, the hooking device is provided on the outer side of the seatback and easily visible from the outside. Therefore, there is a possibility of detracting from the appearance of the motorcycle.

Fourth, in view of the appearance, improving the appearance of the motorcycle by providing a covering member for covering the hooking device from outside may be conceivable. However, if such were simply done, the covering member would stand in the way of visually recognizing a possibly insufficient state of fit between the locking pin and the hook at the time of the work for securing the seatback to the vehicle body side. Therefore, there would be a risk of the securing work being left unfinished, in an incomplete state.

SUMMARY OF THE INVENTION

This invention has been made in view of the above circumstances. It is therefore an advantage of the present invention to facilitate the work for securing a vehicle component to a vehicle body side and that the securing work can be done even in a small space.

Another advantage of the present invention is to firmly sustain the load, exerted from the component toward the vehicle body, on the vehicle body side.

Still another advantage of the present invention is to improve the appearance of the vehicle, in addition to accomplishing the above advantages.

Still another advantage of the present invention is, when the work for securing the vehicle component to the vehicle body side is done, to prevent the work from being left in an incomplete state due to incorrect operation or the like.

According to an embodiment of the present invention, a device for attaching and removing a component to and from a vehicle with a vehicle body side formed with a contacted portion with which the component can come into contact is provided with a locking device that makes a "locking action" for removably attaching the vehicle component to the vehicle body side in the state of the component held in contact with the contacted portion. The component is made capable of coming from outside into contact with the contacted portion and movable in one direction A generally in a straight line while the component remains in contact with the contacted portion, and the locking device is adapted to make the "locking action" as interlocked with the motion of the component in the one direction A.

A plural number of the contacted portions are provided, so that the component is adapted to come into contact with the respective contacted portions.

The component can be placed on the contacted portion.

The component is formed with a notch extending along the one direction A. The notch is removably fitted to a fitted portion formed on the vehicle body side, both of mutually opposing edges out of respective edges of the notch are made capable of coming into contact with the outer surface of the fitted portion, and the outer surface of the fitted portion is made to serve as the contacted portion.

The edge in the deepest portion of the notch is made capable of coming into contact with the fitted portion so that the "locking action" of the locking device is completed along with the contact.

According to an embodiment of the present invention, the locking device includes a locking member attached to the vehicle body side, and a locking mechanism attached to the component and unlockably locking each other with the locking member, thereby causing the locking device to make the "locking action." The locking mechanism is adapted to be covered almost entirely with the component from an outer side to the one direction A.

The locking device is provided with an operation lever for making interlocked motion with the locking mechanism and the state after the "locking action" is unlocked by an operation of the operation lever, and the operation lever is almost entirely covered with the component from the outer side in the state of the locking device having made the "locking action."

The operation lever after unlocking the state of the locking device having made the "locking action" is covered at least partially with the component from the outer side.

A locked attitude of the component secured to the vehicle body side by the "locking action" of the locking device is made different from an unlocked, free state attitude of the component after the "locking action resultant" state of the locking device is unlocked.

The vehicle is assumed to be of a straddling type and the component is assumed to be a seatback for a rider seated on a seat.

According to an embodiment of the present invention, a device for attaching and removing a component to and from a vehicle with a vehicle body side formed with a contacted portion with which the component can come into contact is provided with a locking device for making a "locking action" for removably attaching the vehicle component to the vehicle body side in the state of the component made in contact with the contacted portion. The component is made capable of coming from outside into contact with the contacted portion and movable in one direction generally in a straight line while the component remains in contact with the contacted portion, and the locking device is adapted to make the "locking action" simultaneously with the motion of the component in the one direction.

Therefore, the work for securing the component, the seatback, to the vehicle body side can be done as follows: The component is simply brought into contact with the contacted portion. Next, if the component, while remaining in contact with the contacted portion, is moved nearly in a straight line, the locking device automatically makes a "locking action," so that the component is secured. In other words, the component securing work is accomplished very easily through a simple motion of the component.

Moreover, a nearly straight motion of the component suffices for the securing work and accordingly the work can be done in a small space, which is advantageous for vehicles in general having little surplus space.

A plural number of the contacted portions are provided, so that the component is adapted to come into contact with the respective contacted portions.

Therefore, when the component is brought into contact with the contacted portions during the work for securing the component, the attitude of the component is stabilized and accordingly the securing work is facilitated. The component can be placed on the contacted portion.

Therefore, when the component is brought into contact with or placed on the contacted portion during the component securing work, the component can be temporarily placed on the contacted portion, so that its weight is sustained with the contacted portion. Consequently the motion of the component thereafter in the one direction is facilitated, and the securing work is facilitated.

The component is formed with a notch extending along the one direction, the notch is removably fitted to a fitted portion formed on the vehicle body side, both of mutually opposing edges out of respective edges of the notch are made capable of coming into contact with the outer surface of the fitted portion, and the outer surface of the fitted portion is made to be the contacted portion.

Therefore, in the component securing work, the component is positioned relative to the vehicle body side when the notch of the component is fitted to the contacted portion. Consequently, the motion of the component thereafter in the one direction is facilitated, and the securing work is further facilitated.

Besides, when a load is applied from the component toward the vehicle body after the component is secured to the vehicle body, if the direction of the load intersects the one direction, the load is supported not only with the vehicle body side through the locking device, but also directly with the fitted portion. Accordingly, the load applied from the component toward the vehicle body is firmly supported with the vehicle body side.

The edge in the deepest portion of the notch is made capable of coming into contact with the fitted portion so that the "locking action" of the locking device is completed along with the contact.

Therefore, when a load is applied from the component toward the vehicle body after the component is secured to the vehicle body, if the load is directed in the one direction, the load is supported directly with the fitted portion, not through the locking device. Accordingly, the load applied from the component toward the vehicle body is firmly supported with the vehicle body side.

The locking device includes a locking member attached to the vehicle body side, and a locking mechanism attached to the component and unlockably locking each other with the locking member, thereby causing the locking device to make the "locking action," wherein the locking mechanism is adapted to be covered almost entirely with the component from the outer side to the one direction.

Therefore, the locking mechanism of the locking device is prevented from being easily seen from the outside owing to the component. Consequently the appearance of the vehicle is improved. This improvement in the appearance, which is owing to the use of the component, is therefore accomplished with a simple constitution.

The locking device is provided with an operation lever for making interlocked motion with the locking mechanism, the state after the "locking action" is unlocked by an operation of the operation lever, and the operation lever is almost entirely covered with the component from the outer side in the state of the locking device having made the "locking action."

Therefore, the operation lever of the locking device is prevented from being easily visible from the outside owing to the component, so that appearance of the vehicle is improved. This improvement in the appearance, which is owing to the use of the component, is therefore accomplished with a simple constitution.

The operation lever after unlocking the state of the locking device having made the "locking action" is covered at least partially with the component from the outer side.

Therefore, if the other part of the operation lever after the component securing work is easily visible from the outside, it means that the "locking action" of the locking device has not been made completely. That is to say, this implies that the "locking action" should be made completely. Therefore, the securing work is prevented from being left incomplete, so that the work for securing the component to the vehicle body is accomplished more reliably.

A locked attitude of the component secured to the vehicle body side by the "locking action" of the locking device is made different from an unlocked, free state attitude of the component after the "locking action resultant" state of the locking device is unlocked.

Therefore, whether or not the component is secured to the vehicle body side may be easily confirmed by visual recognition of which of the attitudes the component is in. Consequently, the component is prevented from being used incorrectly while the component remains not being secured to the vehicle body side.

The vehicle is assumed to be of a straddling type and the component is assumed to be a seatback for a rider seated on a seat.

Therefore, it is advantageous that the straddling type of vehicle is provided with the above effects.

DETAILED DESCRIPTION OF THE INVENTION

Figure 1:
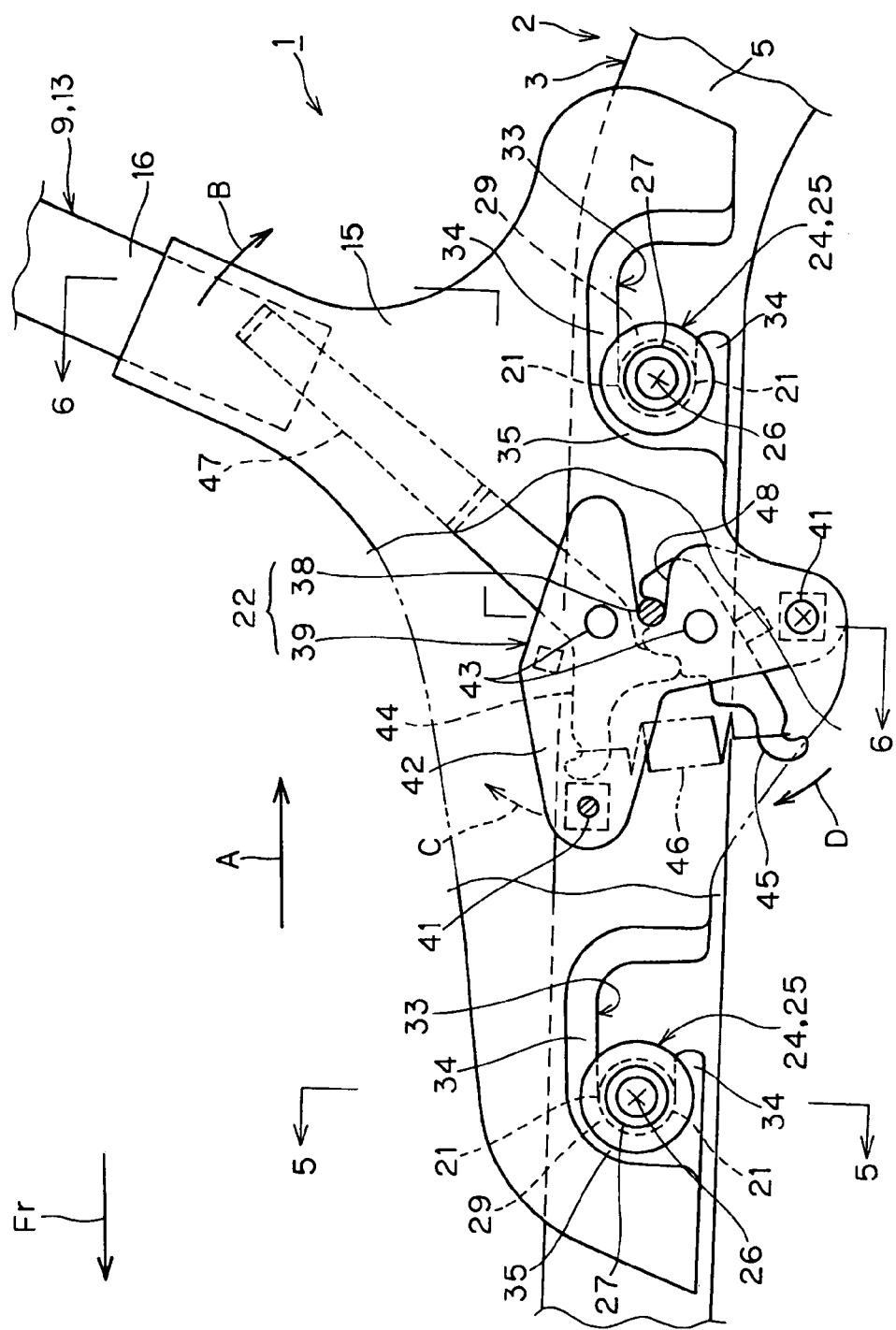
FIG. 1 is an enlarged, partial, sectional view of a rear part of a vehicle.

In relation to the device for attaching and removing the component to and from the vehicle, to do the work for securing the component to the vehicle body side of the vehicle, by making it possible to facilitate the securing work and enabling the securing work even in a small space, is as follows.

That is, the vehicle body side of the vehicle is provided with a contacted portion to be contacted with a component of the vehicle, and with a locking device that makes a "locking action" so as to secure the component to the vehicle body side in a releasable state while the component is made to remain in contact with the contacted portion. The component is adapted to come into contact from the outside with the contacted portion and move, while remaining in contact with the contacted portion, nearly in a straight line in one direction, and the locking device is adapted to make a "locking action" as interlocked with the straight motion of the component in the one direction.

To illustrate the details of the invention, an embodiment is described in reference to the appended drawings.

In FIGS. 1 to 6, the reference numeral 1 denotes a vehicle, more specifically a motorcycle of a straddling type. The arrow Fr denotes the advancing direction of the vehicle 1. The terms right and left are defined as in the direction of the width of the vehicle 1.

The vehicle body 2 of the vehicle 1 is specifically a vehicle body side of a motorcycle. The vehicle body 2 includes a vehicle body frame 3 constituting its framework. The vehicle body frame 3 is made up of paired right and left side frames 5 placed symmetrically on both sides of the vehicle's center 4 in the width direction.

The vehicle body 2 also includes a rear wheel 7 for supporting the vehicle body frame 3 above the road surface 6, a tandem seat 8 supported on the vehicle body frame 3, a seatback 9 adjacent behind the seat 8 and supported with the side frames 5 of the vehicle body frame 3 for use by the rider seated astraddle on the seat 8, and paired right and left saddlebags 10 placed on the right and the left outer sides of both the seat 8 and the seatback 9 and supported with the vehicle body frame 3. The seat 8, the seatback 9, and the right and left saddlebags 10 are the components 13 of the vehicle 1. The seat 8 and the seatback 9 are placed in the vehicle's center 4 in the width direction.

The seatback 9 includes paired right and left sheet metal-made base members 15 constituting the bottom edge portions of the seatback 9 and extending long in the longitudinal direction, paired right and left pipe-made brackets 16 extending in a rearward manners, upward from both the base members 15 with their extending ends joined together forming a single member, a cross member 17 interconnecting the right and left brackets 16, and a pad or a seatback body 18 secured to the brackets 16. Each of the base members 15 is placed near the outer side of each side frame 5 to face each other in the lateral direction of the vehicle 1. The seat 8 is located, as for the vertical direction, between the base members 15 and the seatback body 18.

A plural number of contacted portions 21 to be contacted with the base members 15 of the seatback 9 are formed on the vehicle body 2 side. The base members 15 may come into contact respectively from the outer side toward the respective contacted portions 21. The seatback 9 is made capable of moving in one direction A, or rearward, nearly in a straight line, with the base members 15 of the seat back 9 remaining in contact with the respective contacted portions 21. A pair of right and left locking devices 22 are provided which make a "locking action" as interlocked with the motion of the seatback 9 in the one direction A so as to removably secure the seatback 9 to the vehicle body 2 side with the seatback 9 remaining in contact with the contacted portions 21. In the state of the locking device 22 having made the "locking action," the seatback 9 is made in a usable, raised attitude and in a "secured state" as secured to the vehicle body 2 side (depicted with solid lines in FIGS. 1 to 6).

A plural number (paired front and rear) of fitted portions 25 are formed in parts 24 of the vehicle body 2 side so as to project respectively in the directions of the vehicle 1's width from the respective side frames 5 of the vehicle frame 3. Each of the fitted portions 25 includes a collar 28 of a circular cross section with its axis 26 extending in the direction of the vehicle 1's width and secured to the side frame 5 using a fastening device 27, and a rotary wheel 29 fitted over the collar 28 so as to be rotatable about the axis 26. The rotary wheel 29 is supported on the collar 28 with its motion prohibited in the vehicle 1's width direction. The outside circumferential surface of the rotary wheel 29 is provided with a circumferential groove 30 about the axis 26.

The base members 15 constituting the bottom edge portions of the seatback 9 are each provided with a plural number of (paired front and rear) notches 33 extending first upward from the bottom edge of the base member 15 and then forward, opposite to the direction A.

Each fitted portion 25 or part 24 of the vehicle body 2 side and each notch 33 are made to fit removably to each other. Here, of the edges 34, 35 of part of the notch 33 extending in the direction A, both edges 34 facing each other in the vertical direction are made capable of coming into contact with the fitted portion 25 or part 24 of the vehicle body 2 side.

To put it more concretely, both the edges 34 and both the circumferential grooves 30 of the fitted portions 25 fit with each other. The edges 34 are made capable of coming into contact with the bottom surfaces of the circumferential grooves 30, or the outer surfaces of the fitted portions 25. The bottom surfaces of the circumferential grooves 30 are made to be the contacted portions 21. Also, of both the edges 34, the upper one 34 is designed to be placed on the upper part of the bottom surface of the circumferential groove 30.

As indicated with solid lines in FIGS. 1 to 6, when the seatback 9 is moved in the direction A with each of the base members 15 of the seatback 9 remaining in contact with the outer surface of both the fitted portions 25, the edge 35 at the deepest (fore-end) part of the notch 33 extending in the direction A is capable of coming into contact with the fitted portion 25 or part 24 of the vehicle body 2 side. More specifically, when the edge 35 contacts the fitted portion 25, the circumferential groove 30 of the fitted portion 25 and the edge 35 fit with each other, and the edge 35 contacts the outer surface of the fitted portion 25, or the bottom surface of the circumferential groove 30. Along with this contact, the "locking action" of the locking device 22 is completed, and the seatback 9 is secured to the vehicle body 2 side, and the seatback 9 is in the "secured state."

Meanwhile, when the seatback 9 is moved in the one direction A, the rotary wheel 29 rotates about the axis 26 along with the motion of the seatback 9 to smooth the motion of the seatback 9.

Each of the locking devices 22 includes a locking member 38 provided to project toward the outside from the side frame 5 of the vehicle body frame 3 or the vehicle body 2 side, and a locking mechanism 39 attached to the base member 15 of the seatback 9 for causing the locking device 22 to make the "locking action" of mutually engaging with the locking member 38 in a releasable state.

The locking mechanism 39 is located between the outside surface of the side frame 5 and the inside surface of the base member 15 of the seatback 9. The locking mechanism 39 includes a base plate 42 secured to the base member 15 using fastening pieces 41, upper and lower locking plates 44 and 45 each supported rotatably with a pivot shaft 43 on the base plate 42, a bias spring 46 provided between the locking plates 44 and 45 to engage them with each other, and an operation lever 47 attached thereto, extending like an integral part of, and moving together with the upper locking plate 44. The base plate 42 is formed with a notch 48 extending forward, opposite the one direction A, from the rear edge or the one direction A end of the base plate 42 toward the mutually engaging portion of both the locking plates 44 and 45.

When the locking device 22 makes the "locking action" as shown with solid lines in FIGS. 1 to 6, the locking member 38 goes deepest into the notch 48 and is prevented from coming out of the notch 48 with the lower locking plate 45. The lower locking plate 45 is prevented from freely turning with both the upper locking plate 44 and the spring 46. In this way, the seatback 9 is set in the "secured state" toward the vehicle body 2.

Figure 7:
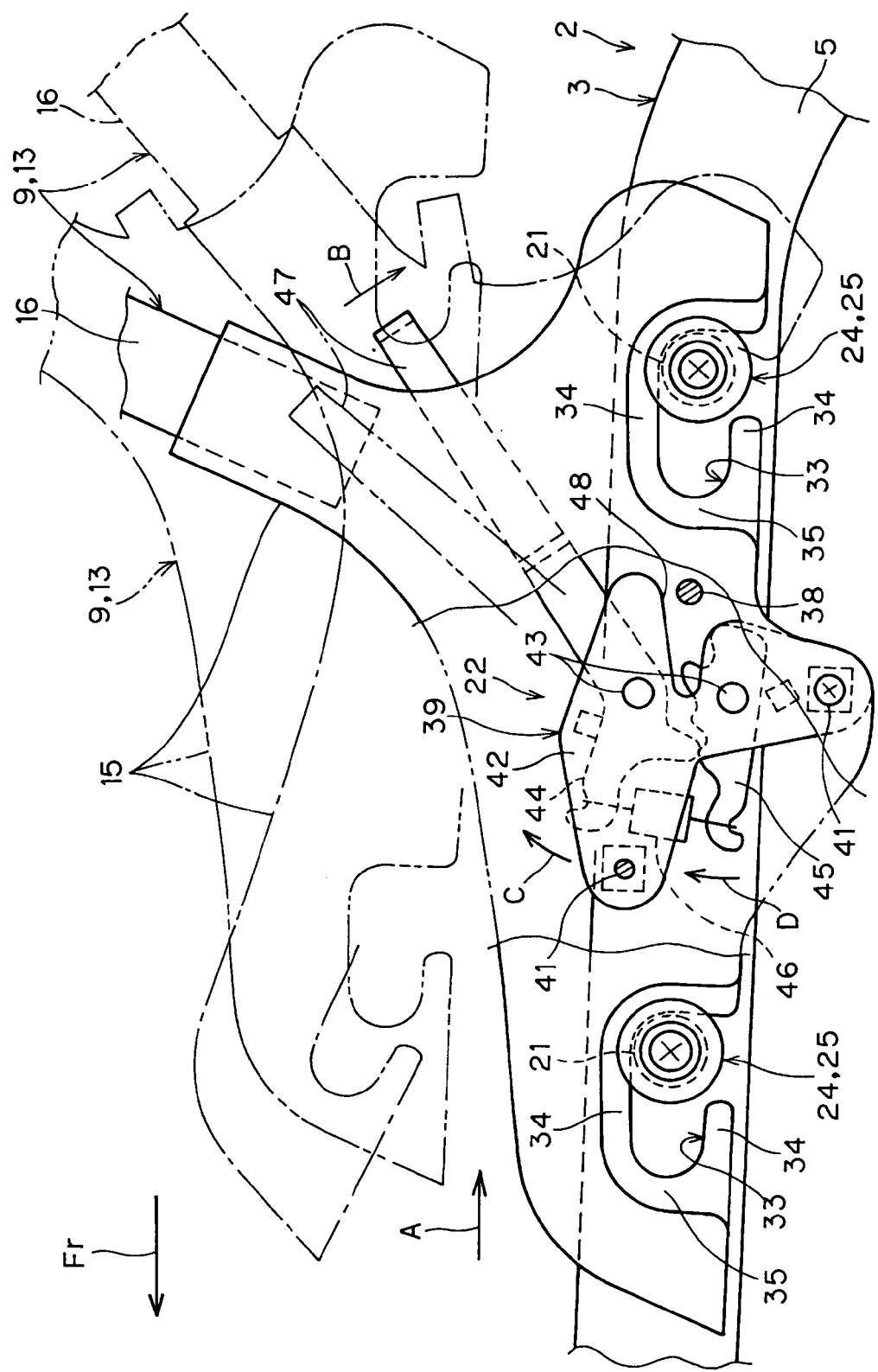
FIG. 7 is a counterpart of FIG. 1 for explaining actions.

In FIG. 7, when the operation lever 47 is operated to turn the seatback 9 downward B from the "secured state", the upper locking plate 44 turns C together with the operation lever 47 to permit the turning motion D of the lower locking plate 45. If the seatback 9 is moved in the direction opposite to the one direction A by a specified dimension, the lower locking plate 45 is turned D with the biasing force of the spring 46, and the locking mechanism 39 is removed forward of the locking member 38.

In other words, when the operation lever 47 is operated, the locking device 22 makes an "unlocking action" to release the "locking action resultant" state. That is, the "secured state" of the seatback 9 to the vehicle body 2 side is released, and the seatback 9 is set to a "securing-released state" (solid lines in FIG. 7).

As described above, when the seatback 9 in its "secured state" and is moved forward by a specified dimension into the "securing-released state," the rear edges of the notches 33 of the base members 15 of the seatback 9 come into contact with the fitted portions 25 to prevent the seatback 9 from moving further forward (solid lines in FIG. 7).

Figure 2:
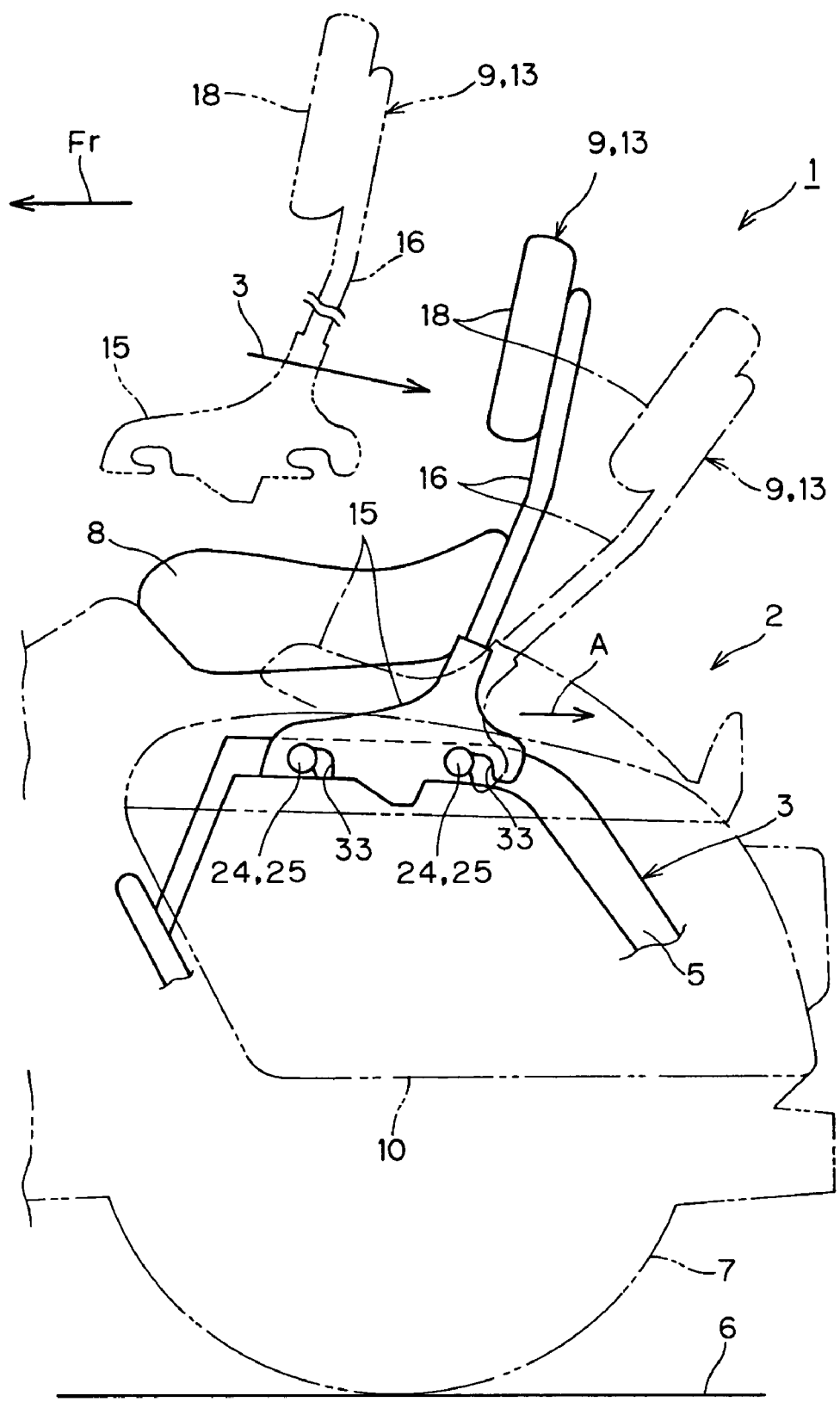
FIG. 2 is a simplified side view of the rear part of the vehicle.
Figure 3:
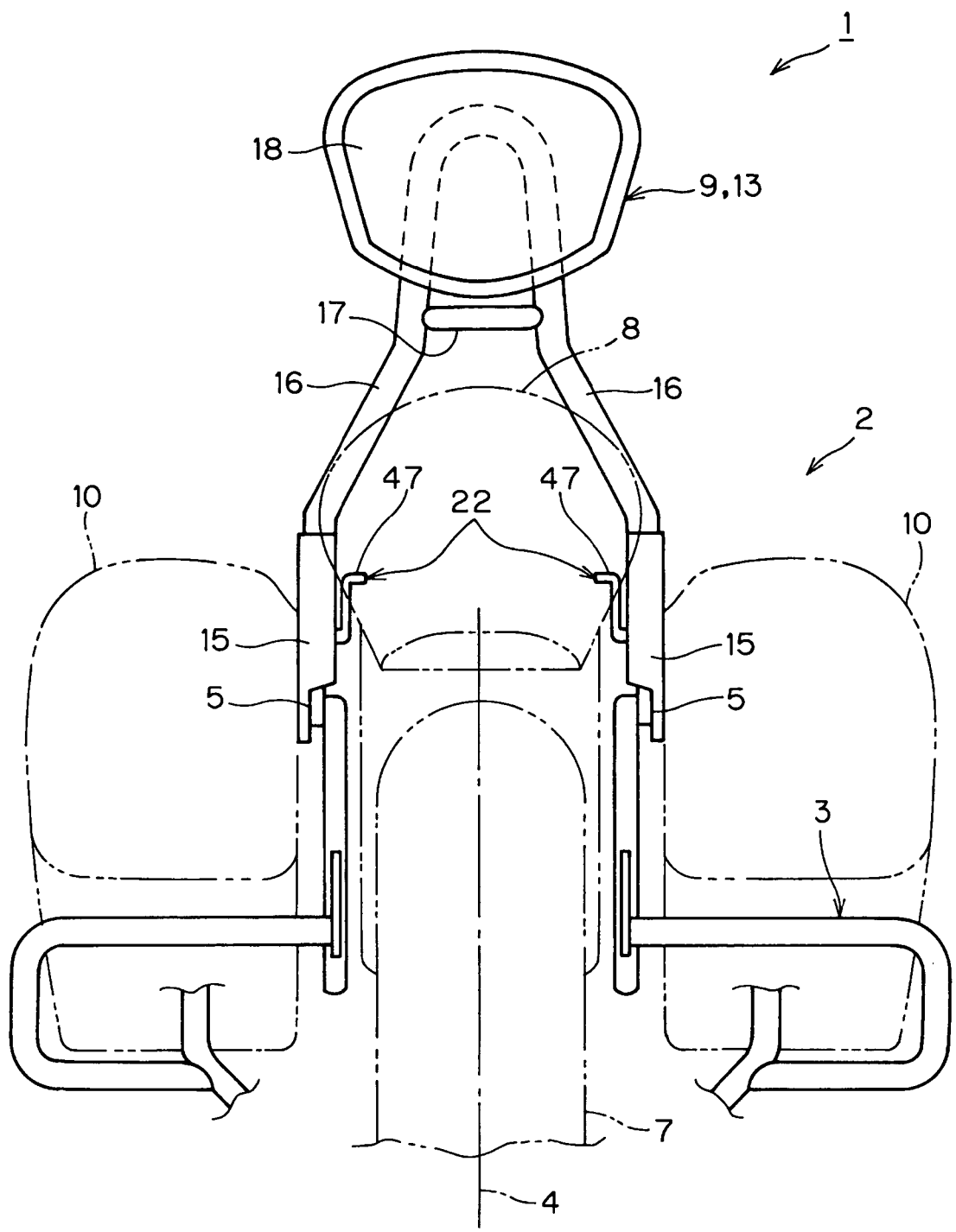
FIG. 3 is a view along the arrow 3 in FIG. 2.
Figure 4:
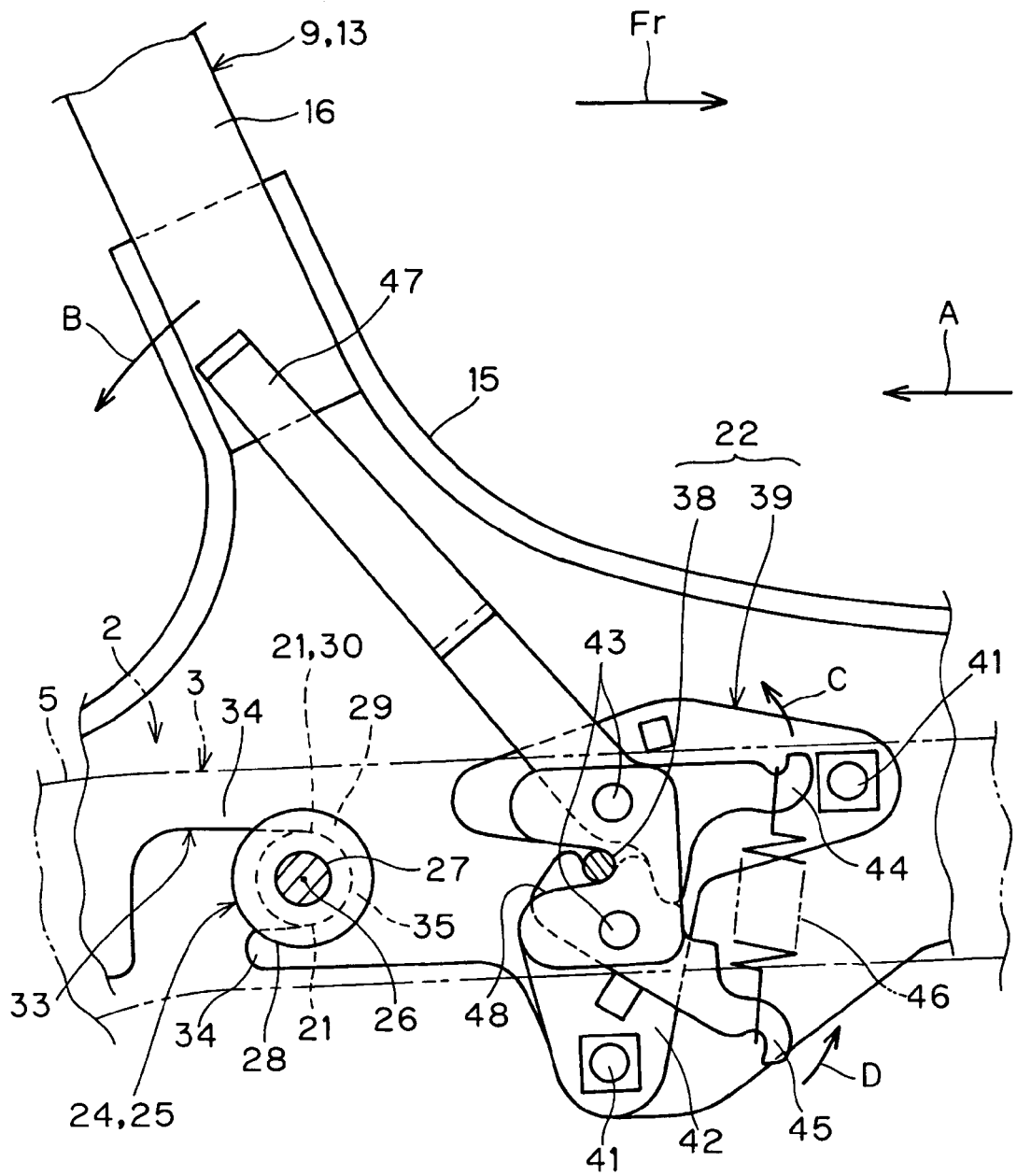
FIG. 4 is part of FIG. 1 as seen from the reverse side.
Figure 5:
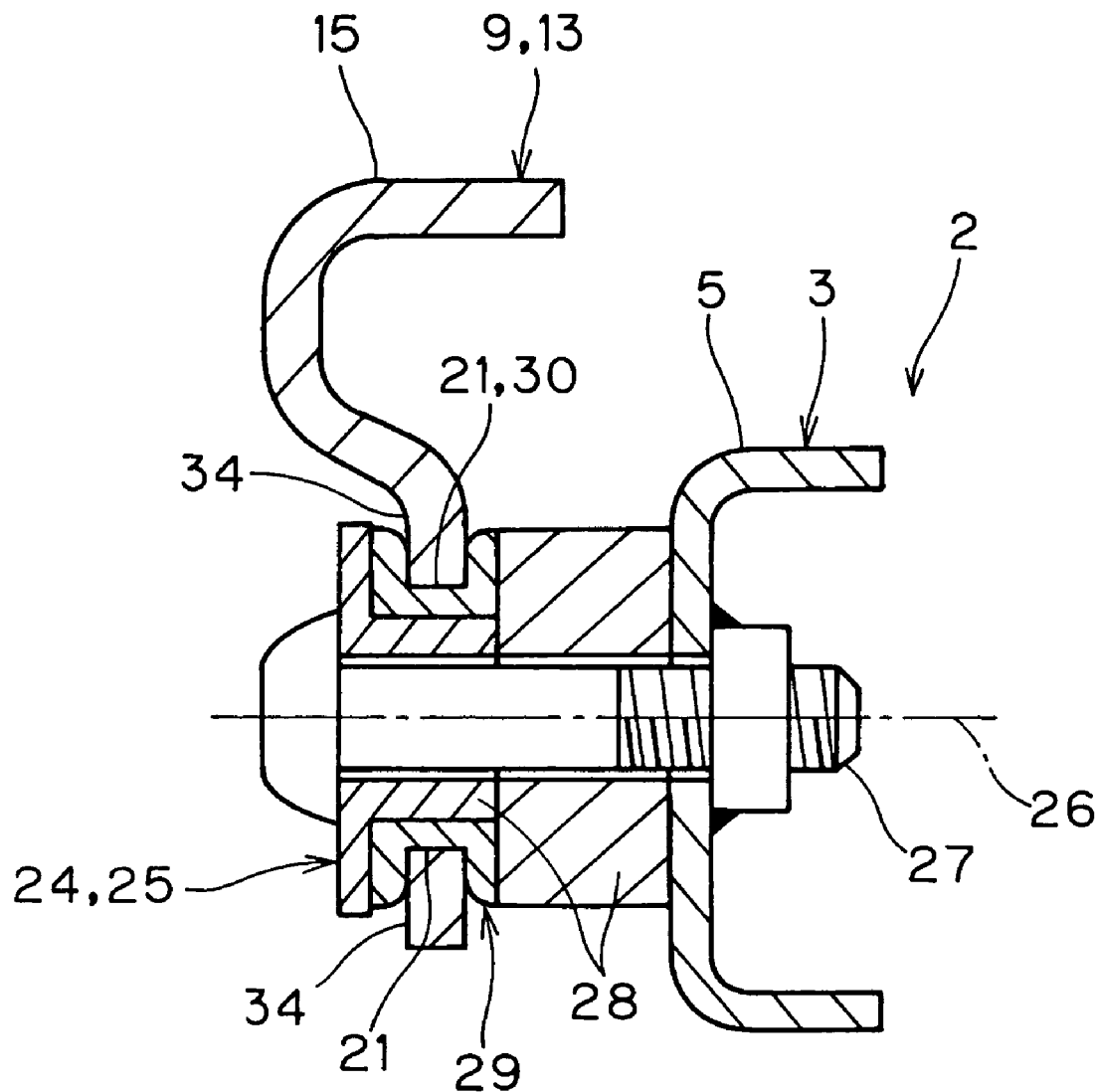
FIG. 5 is a sectional view along the arrow 5—5 in FIG. 1.
Figure 6:
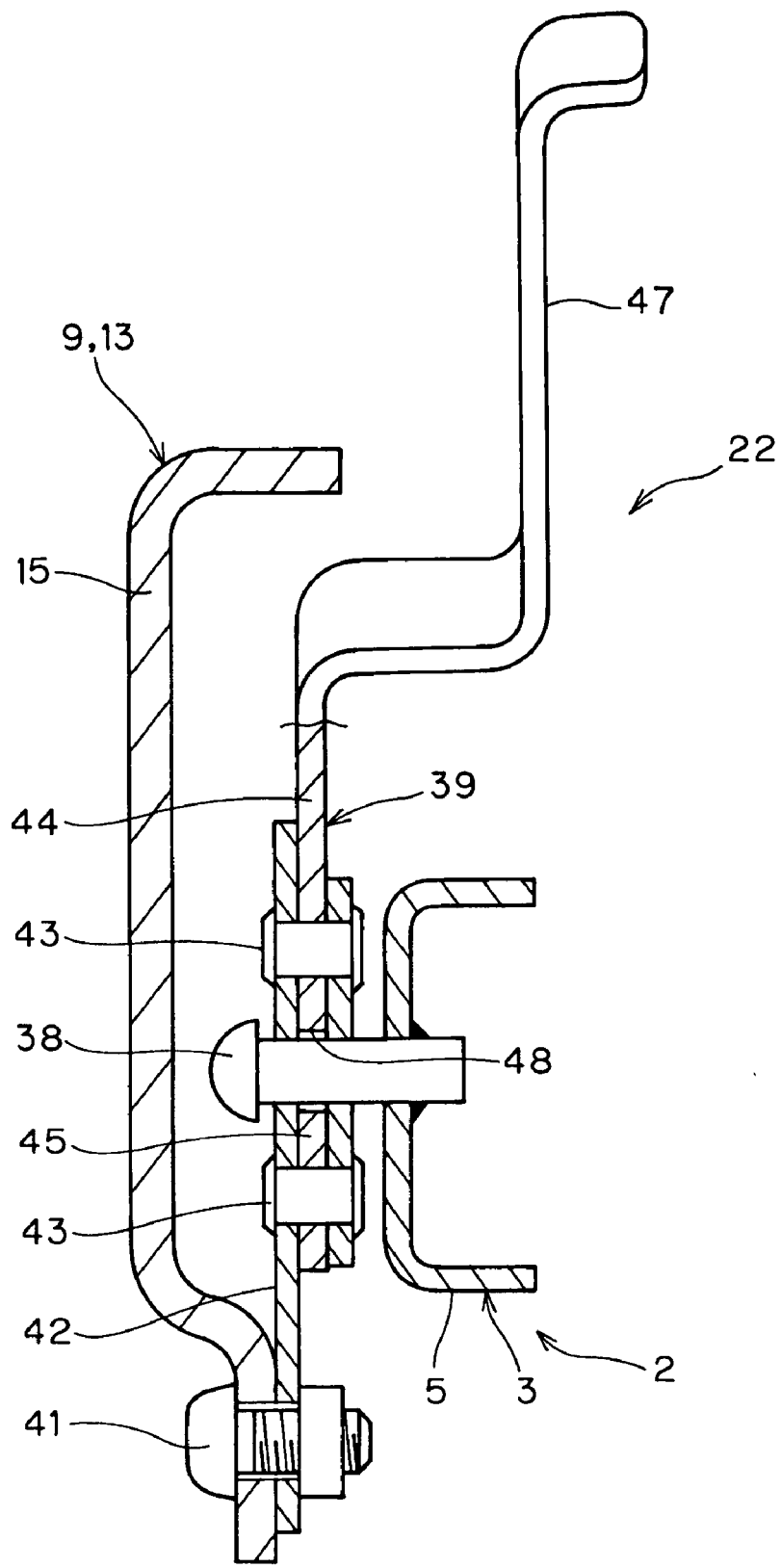
FIG. 6 is a sectional view along the arrow 6—6 in FIG. 1.

If the seatback 9 as a whole is lifted from its "securing-released state," both the rear edges of the notches 33 of the base members 15 of the seatback 9 are removed upward, and the seatback 9 may be removed outward of the vehicle body 2 side (dash-and-double-dotted lines in FIG. 7; dash-and-triple-dotted lines in FIG. 2).

When a securing work is to be done, from the state of the seatback 9 removed outward of the vehicle body 2 side as described above to secure the seatback 9 to the vehicle body 2 side, the seatback 9 is lowered from above outside the vehicle body 2 side (dash-and-triple-dotted lines in FIG. 2; dash-and-double-dotted lines in FIG. 7), to fit the notches 33 of the base members 15 of the seatback 9 with the fitted portions 25. Here, the edges 34 of the seatback 9 are brought into contact with the bottom of the circumferential grooves 30 and the contacted portions 21, of the fitted portions 25 (solid lines in FIG. 7).

Next, the edges 34, held in contact with respective contacted portions 21, of the seatback 9 are moved nearly in a straight line in the one direction A. This will cause the notch 48 to fit with the locking member 38 of the locking device 22 and simultaneously, part of the lower locking plate 45 is pressed with the locking member 38, so that the lower locking plate 45 is turned against the biasing force of the spring 46 (opposite to the direction D in FIG. 7). Also with the biasing force of the spring 46, as interlocked with the turning of the lower locking plate 45, the upper locking plate 44 and the operation lever 47 rotate (opposite to the directions B, C in FIG. 7), so that the locking device 22 makes the "locking action." This will set the seatback 9 to the "secured state" as it is secured to the vehicle body 2 side (solid lines in FIGS. 1 to 6), ending the securing work for the seatback 9.

On the other hand, to do the work for removing the component 13, the seatback 9, from the vehicle body 2 side, the operation lever 47 is turned in the direction B to cause the locking device 22 to make the "unlocking action" into the "securing-released state" (solid lines in FIG. 7). Thereafter, the work may be done in the reverse order of the securing work.

Therefore, when the work for securing the seatback 9, the component 13, to the vehicle body 2 side, if the component 13 is simply brought into contact with the contacted portions 21 and then moved nearly in a straight line in the one direction A while holding the contact with the contacted portions 21, the locking device 22 makes automatically the "locking action" to secure the component 13. In other words, the work for securing the component 13 is accomplished very easily by the simple action of the component 13.

The motion of the component 13 in a nearly straight line suffices for the securing work. Accordingly, the securing work may be done in a small space, which is advantageous for vehicles 1 in general having little surplus space.

Also, a plural number of the contacted portions 21 are provided as described above, so that the component 13 is adapted to come into contact with the respective contacted portions 21.

Therefore, when the component 13 is brought into contact with the contacted portions 21 during the work for securing the component 13, the attitude of the component 13 is stabilized. Accordingly the securing work is facilitated.

Also as described above, the component 13 may be placed on the contacted portions 21, so that the component 13 is adapted to come into contact with the contacted portions 21 as the component 13 is placed on the contacted portions 21.

Therefore, when the component 13 is placed on and brought into contact with the contacted portions 21 during the securing work for the component 13, the component 13 may be temporarily placed on the contacted portions 21 so that the weight of the component 13 is supported with the contacted portions 21. Therefore, the motion of the component 13 thereafter in the one direction A is facilitated, so that the securing work is further facilitated.

Also as described above, the component 13 is provided with the notches 33 extending in the one direction A, the notches 33 are made to fit removably with the fitted portions 25 formed on the vehicle body 2 side, both the edges 34 opposing each other out of the edges 34, 35 of the notches 33 are made capable of contacting the outer surfaces of the fitted portions 25, and the outer surface of the fitted portions 25 are made to be the contacted portions 21.

Therefore, to do the work for securing the component 13, if the notches 33 of the component 13 are first made to fit with the fitted portions 25, positioning of the component 13 is finished relative to the fitted portions 25 formed on the vehicle body 2 side. Consequently, the motion thereafter of the component 13 in the one direction A is facilitated and the securing work is facilitated.

If a load is applied from the component 13 secured on the vehicle body 2 to the vehicle body 2 side, and if the direction of the load intersects the one direction A, the load is sustained not only with the vehicle body 2 side through the locking device 22, but also directly with the fitted portions 25. Therefore, the load applied from the component 13 toward the vehicle body 2 is firmly sustained with the vehicle body 2 side.

In the above constitution, the edges 34 of the notches 33 are made to fit in the circumferential grooves 30 of the rotary rings 29 of the fitted portions 25 or parts 24 of the vehicle body 2 side, so that the rotary rings 29 are prevented from moving in the direction of the vehicle's width. Consequently, positioning of the component 13 relative to the vehicle body 2 side is made also in the vehicle 1's width direction. As a result, the motion of the component 13 thereafter in the one direction A is facilitated, so that the securing work is further facilitated.

Also as described before, the edges 35 in the deepest portions of the notches 33 are made capable of coming into contact with the fitted portions 25 so that the "locking action" of the locking device 22 is completed along with the contact.

Therefore, if a load is applied from the component 13, after it is secured on the vehicle body 2, to the vehicle body 2 side, and if the load is directed in the one direction A, the load is sustained not through the locking device 22, but directly with the fitted portions 25. Therefore, the load applied from the component 13 toward the vehicle body 2 is firmly sustained on the vehicle body 2 side.

As shown in FIGS. 1 to 6, the locking mechanism 39 is covered almost entirely with the base member 15 of the seatback 9 from the outside to the one direction A (from outside the vehicle 1) irrespective of the "locking action" or "unlocking action" of the locking device 22.

Therefore, the locking mechanism 39 of the locking device 22 is prevented with the component 13 from being easily seen in appearance, which improves the appearance of the vehicle 1. This improvement in the appearance, which depends on the use of the component 13, is therefore accomplished with a simple constitution.

In the state of the locking device 22 having made the "locking action," the operation lever 47 is covered almost entirely with the base member 15 of the seatback 9 from the outside.

Therefore, the lever 47 of the locking device 22 is prevented from being easily seen in appearance with the component 13, which improves the appearance of the vehicle 1. This improvement in the appearance, which is owing to the use of the seatback 9 of the component 13, is therefore accomplished with a simple constitution.

As indicated with the solid lines in FIG. 7, when the operation lever 47 is operated to cause the locking device 22 to make the "unlocking action" so as to unlock the "locking action resultant" state of the locking device 22, at least the base portion, only part of the operation lever 47 after having made the "unlocking action," is covered with the base member 15 of the seatback 9 from the outside.

Therefore, if the other part, the projecting end, of the operation lever 47 is easily seen in appearance when the work for securing the seatback 9, the component 13, has been made, it means that the locking device 22 has not made the "locking action" sufficiently. In other words, it implies that the locking device 22 should be caused to make a sufficient "locking action" in the securing work. Therefore, the securing work is prevented from being left unfinished, namely incomplete, so that the work for securing the component 13 to the vehicle body 2 side is accomplished more securely.

In FIG. 7, the center of gravity of the seatback 9, the component 13, in the raised attitude is behind the base member 15. Therefore, when the component 13 is in a free state, in the "securing-released state" after the locking device 22 is released from the "locking action resultant" state, the seatback 9 turns rearward, as shown with dash-and-dotted lines in FIG. 7, about one of the front and rear fitted portions 25. When the seatback 9 turns rearward by a specified angle, the seatback 9 is prevented from turning further rearward, and is held in a tilted attitude as the front end of the base member 15 of the seatback 9 comes into contact with the seat 8.

In reference to all the drawings, the raised attitude, the locked attitude (solid lines in FIGS. 1 to 6) of the component 13 in the "locked state," with the component 13 locked to the vehicle body 2 side by the "locking action" of the locking device 22, is set to be different from the tilted attitude, the unlocked attitude of the component 13 (dash-and-dotted lines in FIG. 7) in a free state, in the "securing-released state", resulting from the releasing of the "locking action resultant" state of the locking device 22.

Therefore, whether or not the seatback 9, the component 13, is secured to the vehicle body 2 side is easily determined by visual recognition of which of the attitudes the component 13 is in. Therefore, the component 13, the seatback 9, is prevented from being used inadvertently in the state not secured to the vehicle body 2 side.

While the above description is related to the illustrated example, the vehicle 1 may be a three-wheeled motorcycle, four-wheeled straddling type of automobile, car, or boat. Moreover, the component 13 may be a loading deck or the like. The contacted portion 21 may be a flat surface with which the component 13 comes into surface contact. The one direction A may be forward, vertical, or oblique to these. Furthermore, the fitted portion 25 may be a shaft member made by joining together collar 28 and the rotary ring 29 and secured to the side frame 5 of the vehicle body frame 3.

The invention claimed is:

1. A device for attaching and removing a vehicle component to and from a vehicle, comprising:
   a vehicle body side formed with a contacted portion with which a component can come into contact; and
   a locking device for making a locking action for removably attaching the vehicle component to the vehicle body side in a state of the vehicle component being held in contact with the contacted portion,
   wherein the vehicle component is made capable of coming from outside into contact with the contacted portion and movable in one direction generally in a straight line while the vehicle component remains held in contact with the contacted portion, and the locking device is adapted to make the locking action as interlocked with a motion of the vehicle component in the one direction.

2. The device for attaching and removing a vehicle component to and from a vehicle according to claim 1, wherein a plural number of the contacted portions are provided, so that the vehicle component is adapted to come into contact with the plural number of contacted portions.

3. The device for attaching and removing a vehicle component to and from a vehicle according to claim 1, wherein the vehicle component is placed on the contacted portion.

4. The device for attaching and removing a vehicle component to and from a vehicle according to claim 1, wherein the vehicle component is formed with a notch extending along the one direction, the notch is removably fitted to a fitted portion formed on the vehicle body side, both of mutually opposing edges out of respective edges of the notch are made capable of coming into contact with an outer surface of the fitted portion, and the outer surface of the fitted portion is made to serve as the contacted portion.

5. The device for attaching and removing a vehicle component to and from a vehicle according to claim 4, wherein the edge in the deepest portion of the notch is made capable of coming into contact with the fitted portion so that the locking action of the locking device is completed along with contact.

6. The device for attaching and removing a vehicle component to and from a vehicle according to claim 1, wherein the locking device comprises a locking member attached to the vehicle body side, and a locking mechanism attached to the vehicle component and unlockably locking each other with the locking member, thereby causing the locking device to make the locking action, wherein the locking mechanism is adapted to be covered almost entirely with the vehicle component from an outer side to the one direction.

7. The device for attaching and removing a vehicle component to and from a vehicle according to claim 6, wherein the locking device is provided with an operation lever for making an interlocked motion with the locking mechanism and a state after the locking action is unlocked by an operation of the operation lever, and the operation lever is almost entirely covered with the vehicle component from the outer side in a state of the locking device having made the locking action.

8. The device for attaching and removing a vehicle component to and from a vehicle according to claim 7, wherein the operation lever after unlocking the state of the locking device having made the locking action is covered at least partially with the vehicle component from the outer side.

9. The device for attaching and removing a vehicle component to and from a vehicle according to claim 1, wherein a locked attitude of the component secured to the vehicle body side by the locking action of the locking device is made different from an unlocked, free state attitude of the vehicle component after a locking action resultant state of the locking device is unlocked.

10. The device for attaching and removing a vehicle component to and from a vehicle according to claim 1, wherein of a straddling type vehicle is used and the component is a seatback for a rider seated on a seat.

11. A device for attaching and removing a vehicle component to and from a vehicle, comprising:
    a vehicle body side formed with a contacted portion with which a component can come into contact; and
    a locking means for making a locking action for removably attaching the vehicle component to the vehicle body side in a state of the vehicle component being held in contact with the contacted portion,
    wherein the vehicle component is made capable of coming from outside into contact with the contacted portion and movable in one direction generally in a straight line while the vehicle component remains held in contact with the contacted portion, and the locking device is adapted to make the locking action as interlocked with a motion of the vehicle component in the one direction.

12. The device for attaching and removing a vehicle component to and from a vehicle according to claim 11, wherein a plural number of the contacted portions are provided, so that the vehicle component is adapted to come into contact with the plural number of contacted portions.

13. The device for attaching and removing a vehicle component to and from a vehicle according to claim 11, wherein the vehicle component is placed on the contacted portion.

14. The device for attaching and removing a vehicle component to and from a vehicle according to claim 11, wherein the vehicle component is formed with a notch extending along the one direction, the notch is removably fitted to a fitted portion formed on the vehicle body side, both of mutually opposing edges out of respective edges of the notch are made capable of coming into contact with an outer surface of the fitted portion, and the outer surface of the fitted portion is made to serve as the contacted portion.

15. The device for attaching and removing a vehicle component to and from a vehicle according to claim 14, wherein the edge in the deepest portion of the notch is made capable of coming into contact with the fitted portion so that the locking action of the locking means is completed along with contact.

16. The device for attaching and removing a vehicle component to and from a vehicle according to claim 11, wherein the locking means comprises a locking member attached to the vehicle body side, and a locking mechanism attached to the vehicle component and unlockably locking each other with the locking member, thereby causing the locking means to make the locking action, wherein the locking mechanism is adapted to be covered almost entirely with the vehicle component from an outer side to the one direction.

17. The device for attaching and removing a vehicle component to and from a vehicle according to claim 16, wherein the locking means is provided with an operation lever for making an interlocked motion with the locking mechanism and a state after the locking action is unlocked by an operation of the operation lever, and the operation lever is almost entirely covered with the vehicle component from the outer side in a state of the locking means having made the locking action.

18. The device for attaching and removing a vehicle component to and from a vehicle according to claim 17, wherein the operation lever after unlocking the state of the locking means having made the locking action is covered at least partially with the vehicle component from the outer side.

19. The device for attaching and removing a vehicle component to and from a vehicle according to claim 11, wherein a locked attitude of the component secured to the vehicle body side by the locking action of the locking means is made different from an unlocked, free state attitude of the vehicle component after a locking action resultant state of the locking means is unlocked.

20. A method for manufacturing a device for attaching and removing a vehicle component to and from a vehicle, comprising:
    forming a vehicle body side with a contacted portion with which a component can come into contact;
    making a locking action for removably attaching the vehicle component to the vehicle body side in a state of the vehicle component being held in contact with the contacted portion;
    providing the vehicle component to come from outside into contact with the contacted portion and to be movable in one direction generally in a straight line while the vehicle component remains held in contact with the contacted portion; and
    making the locking action as interlocked with a motion of the vehicle component in the one direction.

* * * * *